(12) United States Patent
Plesniak

(10) Patent No.: US 10,663,194 B2
(45) Date of Patent: May 26, 2020

(54) MODULAR SOLAR AIR HEATER

(71) Applicant: Adam Peter Plesniak, Huntington Beach, CA (US)

(72) Inventor: Adam Peter Plesniak, Huntington Beach, CA (US)

(*) Notice: Subject to any disclaimer, the term of this patent is extended or adjusted under 35 U.S.C. 154(b) by 144 days.

(21) Appl. No.: 15/889,904

(22) Filed: Feb. 6, 2018

(65) Prior Publication Data

US 2018/0224158 A1 Aug. 9, 2018

Related U.S. Application Data

(60) Provisional application No. 62/455,598, filed on Feb. 7, 2017.

(51) Int. Cl.
| | |
|---|---|
| *F24D 11/00* | (2006.01) |
| *F24S 20/40* | (2018.01) |
| *F24S 10/40* | (2018.01) |
| *F24S 10/50* | (2018.01) |
| *F24S 80/20* | (2018.01) |
| *F24S 70/30* | (2018.01) |
| *F24S 70/10* | (2018.01) |
| *F24S 25/40* | (2018.01) |
| *F24S 80/453* | (2018.01) |

(Continued)

(52) U.S. Cl.
CPC ............ *F24S 20/40* (2018.05); *F24F 5/0046* (2013.01); *F24F 11/72* (2018.01); *F24S 10/40* (2018.05); *F24S 10/50* (2018.05); *F24S 25/40* (2018.05); *F24S 40/55* (2018.05); *F24S 70/10* (2018.05); *F24S 70/30* (2018.05); *F24S 80/20* (2018.05); *F24S 80/453* (2018.05); *F24F 2005/0064* (2013.01); *F24F 2005/0067* (2013.01); *F24S 2080/501* (2018.05); *Y02E 10/44* (2013.01)

(58) Field of Classification Search
CPC ....... F24J 2/20; F24J 2/46; F24S 20/00; F24S 21/00; F24S 2010/751; F24D 5/005; F24D 11/007; F24D 11/0257; F24D 11/0264
See application file for complete search history.

(56) References Cited

U.S. PATENT DOCUMENTS 4,379,449 A * 4/1983 Wiggins .................. F24D 5/005
126/631
4,446,850 A * 5/1984 Zilisch .................. F24D 11/007
126/589

(Continued)

FOREIGN PATENT DOCUMENTS

| EP | 2520870 A1 * | 11/2012 | ............. E04B 2/88 |
| FR | 2438803 A1 * | 5/1980 | ............. F24S 70/65 |

*Primary Examiner* — Gregory A Wilson
(74) *Attorney, Agent, or Firm* — Ahmadshahi & Associates

(57) ABSTRACT

A modular solar air heater comprises an extruded metal frame having fingers operable to secure a glazing, an absorber, and an insulating back sheet to the frame. The heater may also operate as a cooler. The heater further comprises an active air circulation system, such as a fan, which may be coupled with an air inlet of the heater. The heater has an air outlet and may further include a bypass channel to direct the airflow alternatively through one or both the bypass channel and the air outlet. A heating element and a cooling element may be coupled with the air outlet to further heat and also cool the air through the air outlet, respectively. A photovoltaic panel may be included to provide electrical power to the heater.

17 Claims, 10 Drawing Sheets

(51) Int. Cl.
*F24F 11/72* (2018.01)
*F24F 5/00* (2006.01)
*F24S 40/55* (2018.01)
*F24S 80/50* (2018.01)

(56) References Cited

U.S. PATENT DOCUMENTS

| | | | |
|---|---|---|---|
| 8,245,947 B2* | 8/2012 | Roderick | F24F 11/0001 |
| | | | 236/49.3 |
| 8,757,143 B2* | 6/2014 | Edens | F24S 10/50 |
| | | | 126/634 |
| 9,401,676 B2* | 7/2016 | Williams | H02S 40/44 |
| 2015/0247652 A1* | 9/2015 | Coulter | F24F 5/0046 |
| | | | 126/632 |
| 2018/0306466 A1* | 10/2018 | Coulter | F28F 3/022 |

* cited by examiner

MODULAR SOLAR AIR HEATER

CROSS REFERENCE TO RELATED APPLICATIONS

The present patent application is a formalization of a previously filed provisional patent application entitled "Modular Solar Air Heater," filed on Feb. 7, 2017, as U.S. patent application Ser. No. 62/455,598 by the inventor(s) named in this application. This patent application claims the benefit of the filing date of the cited provisional patent application according to the statutes and rules governing provisional patent applications, particularly 35 USC § 119 and 37 CFR § 1.78. The specification and drawings of the cited provisional patent application are specifically incorporated herein by reference.

COPYRIGHT

A portion of the disclosure of this patent document contains material which is subject to copyright protection. The owner has no objection to the facsimile reproduction by anyone of the patent disclosure, as it appears in the Patent and Trademark Office files or records, but otherwise reserves all copyright rights whatsoever.

FIELD OF INVENTION

The present invention relates to a solar air heater that includes an extruded metal frame comprising a plurality of flanges, referred to as fingers herein, operable to receive a glazing, an absorber, and an insulating back sheet. The heater further includes an active air circulation system. In an alternative embodiment, a bypass channel, incorporated into the heater, is utilized so as to direct the air to exit partially or completely through the bypass channel. In another alternative embodiment, the heater includes a cooling element to further condition the air through its air outlet.

BACKGROUND

A solar air heater captures solar irradiance and uses it to heat air. Conventional solar air heaters comprise a glazing, an absorber, an insulation back sheet, and a frame which is used to house or otherwise secure these components into a unitary structure having an air inlet and an air outlet. Solar air heaters are used in commercial and industrial applications, such as space heating and industrial process heating. Air enters through the air inlet, is heated by heat transfer from the absorber to the airflow, and exits through the air outlet. Conventional heaters use a glazing which is made from glass. The absorber is a sheet metal coated by an absorbing material, such as TiNOX. The frame is fabricated from sheet metal or wood.

The disclosed modular solar air heater comprises an extruded metal frame having fingers which are used to secure a glazing, an absorber, and an insulating back sheet to the frame. The heater further comprises an active air circulation system, such as a fan, which is coupled with an air inlet of the heater. The heater has an air outlet and may further include a bypass channel to direct the airflow through the bypass channel and/or the air outlet, thus, transforming the heater into a cooler. A heating element and a cooling element may be coupled with the air outlet to further heat and cool the air through the air outlet, respectively. A photovoltaic panel may be included to provide electrical power to the heater.

SUMMARY

In one aspect, a modular solar air heater is disclosed wherein the heater comprises a glazing, an absorber having a top surface and a bottom surface, an insulating back sheet having an air inlet and an air outlet, wherein air enters through the air inlet and exits through the air outlet, an extruded metal frame including a plurality of fingers operable to receive the glazing, the absorber, and the insulating back sheet, said fingers are configured to direct airflow between the bottom surface of the absorber and a top surface of the insulating back sheet so as to prevent dust particle accumulation over the top surface of the absorber, and an active air circulation system coupled with the air inlet.

Preferably, the bottom surface of the absorber includes surface protrusions which operate to induce turbulence in the airflow over the bottom surface of the absorber.

Preferably, the glazing is made from at least one of glass and polymer.

Preferably, the absorber comprises TiNOX material.

Preferably, the heater further comprises a thermostat operative to control a flowrate of the airflow through the active air circulation system.

Preferably, the heater further comprises an extruded cover coupled with the extruded metal frame which operates to further secure the glazing to the extruded metal frame. Preferably, the extruded cover further includes a seal which operates to seal a top surface of the glazing.

Preferably, at least one of the fingers includes a silicone sealant which operates to secure at least one of the glazing and the insulating back sheet to the extruded metal frame.

Preferably, the absorber and the insulating back sheet are secured to the extruded metal frame via interference fit of the absorber and the insulating back sheet and the fingers.

Preferably, the heater further comprises two additional insulating rings, secured to the extruded metal frame.

Preferably, the heater further comprises a bypass channel, wherein the heater is configured to operate so as to direct the air to exit through at least one of the bypass channel and the air outlet. Preferably, the bypass channel and the air outlet are integrated.

Preferably, the heater further comprises a heating element coupled with the air outlet which operates to further heat the air through the air outlet.

Preferably, the heater further comprises a cooling element coupled with the air outlet which operates to further cool the air through the air outlet. Preferably, the cooling element comprises a cooling loop and heat exchanger fins. Preferably, the cooling loop is a heat pipe.

Preferably, the cooling element is further coupled with the absorber which operates to radiate heat through the absorber.

Preferably, the heater further comprises a photovoltaic panel operative to provide electrical power to the heater.

In another aspect, a modular solar air heater and cooler is disclosed wherein the heater and cooler comprises a solar air heater having an air inlet and an air outlet, an active air circulation system coupled with the air inlet, and a cooling element coupled with the air outlet.

In another aspect, a method of conditioning air via a modular solar air heater is disclosed wherein the method comprises providing a glazing, providing an absorber having a top surface and a bottom surface, providing an insulating back sheet having an air inlet and an air outlet, wherein air enters through the air inlet and exits through the air outlet, providing an extruded metal frame including a plurality of fingers operable to receive the glazing, the absorber, and the insulating back sheet, said fingers are configured to direct airflow between the bottom surface of the absorber and a top surface of the insulating back sheet so as to prevent dust particle accumulation over the top surface of the absorber, and providing an active air circulation system coupled with the air inlet.

DETAILED DESCRIPTION OF THE PRESENTLY PREFERRED EMBODIMENTS

Figure 1:
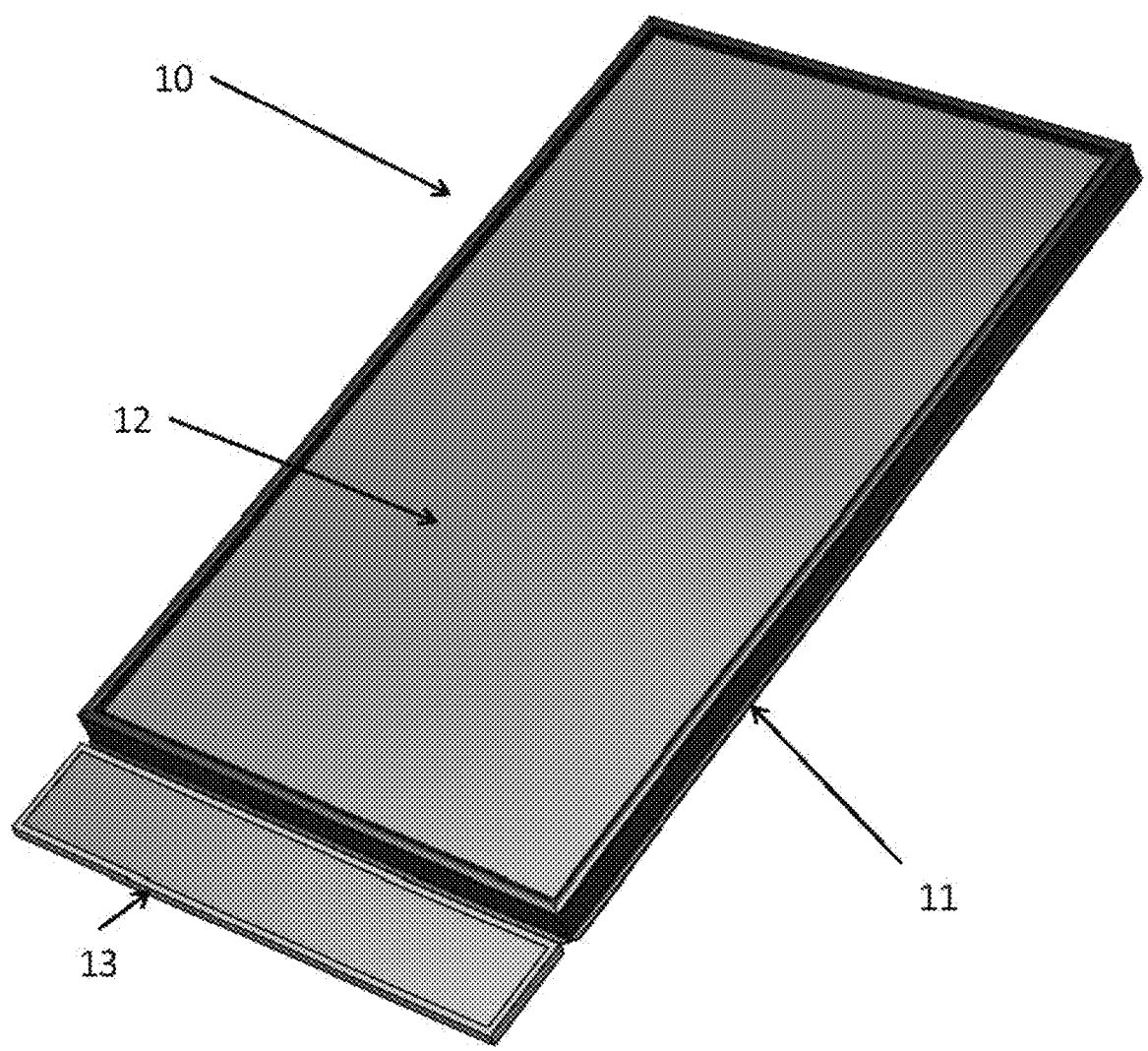
FIG. 1 shows a perspective top view of a preferred embodiment of a modular solar air heater according to the present invention, showing a glazing secured to an extruded metal frame and a photovoltaic panel coupled with the heater.

FIG. 1 depicts a perspective top view of a preferred embodiment of a modular solar air heater 10 according to the present invention. The heater 10 includes a glazing 12 and an extruded metal frame 11 securing the glazing 12 via a plurality of internal flanges (see FIG. 5). In this preferred embodiment, the heater 10 is of rectangular shape but it is contemplated that other shapes such as circular, elliptic, or hexagonal shapes are within the scope of the present invention. In another preferred embodiment, the heater 10 further comprises a photovoltaic panel 13 which may be used to convert solar power into electrical power for use by the heater 10.

The extruded metal frame 11 may be made from a variety of metals suited for extrusion manufacturing process, for instance, aluminum. Furthermore, it is contemplated that other types of extrudates, such as polymers, ceramics, concrete, and modeling clay is within the scope of the invention. In this configuration, the extruded metal frame 11 is of rectangular shape and includes four (4) sides having 45 degrees cut corners which mate against one another during assembly. The glazing 12 is also rectangular in shape and may be made from any material of high clarity, such as glass and polymers.

Figure 2:
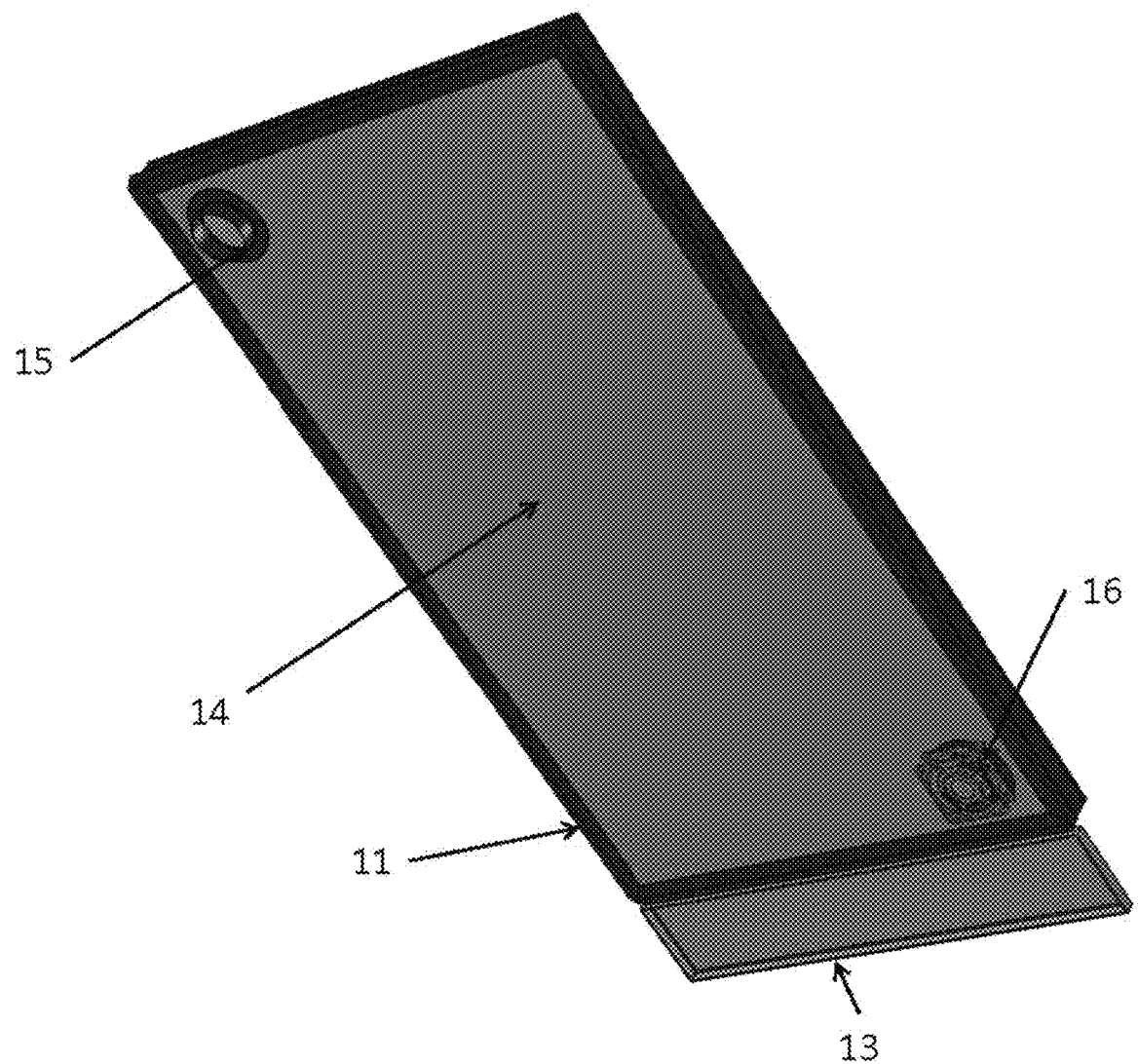
FIG. 2 shows a perspective bottom view of the modular solar air heater of FIG. 1, showing an insulating back sheet having an air outlet and a fan coupled with an air inlet.
Figure 3:
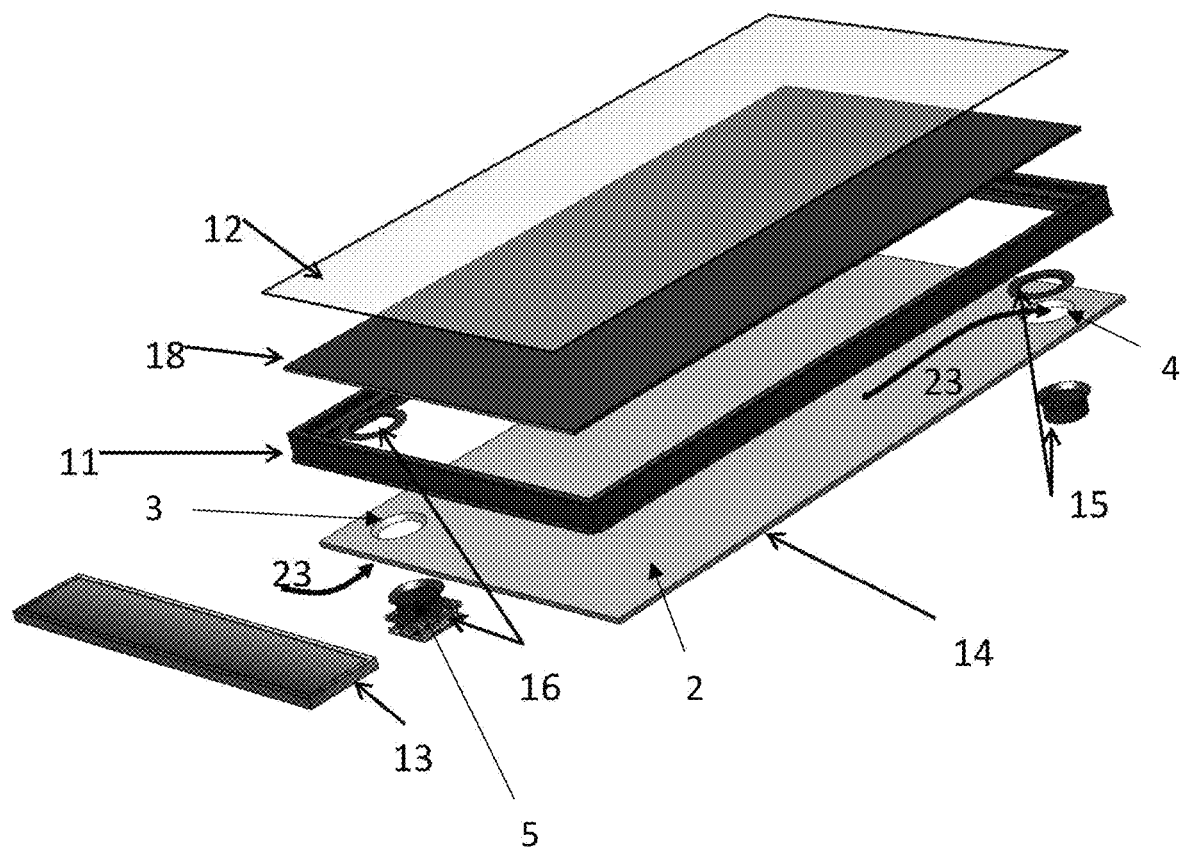
FIG. 3 shows a perspective exploded view of FIG. 1, showing the glazing, an absorber, the insulating back sheet, and the extruded metal frame, further illustrating how air is entered through the air inlet, directed through and between the absorber and the insulating, back sheet, and exited through the air outlet.

FIG. 2 depicts a perspective bottom view of the modular solar air heater 10 of FIG. 1, further showing an insulating back sheet 14 having an air outlet 15 and an active air circulation system, such as a fan, coupled with an air inlet 16 (shown in more detail in FIG. 3). The insulating back sheet 14 is rectangular in shape and may be made from a variety of thermal insulating materials. e.g. fiberglass (specifically glass wool), cellulose, rock, wool, polystyrene foam, urethane foam, vermiculite, perlite, cork, etc. In a preferred embodiment, the photovoltaic panel 13 is utilized to convert solar power into electrical power for consumption by the active air circulation system.

FIG. 3 depicts a perspective exploded view of FIG. 1, showing the glazing 12, an absorber 18, the insulating back sheet 14, and the extruded metal frame 11. Air 23 is entered through the air inlet 16 which includes a fan 5 to increase the flowrate of the airflow of the air 23 through the heater 10. In a preferred embodiment, the heater 10 may further include a thermostat operative to control the flowrate.

The air inlet 16 may be coupled with the insulating back sheet 14 via an interference fit through a circular hole 3 cut into the insulating back sheet 14. The air 23 exits through the air outlet 15 which may be coupled with the insulating back sheet 14 via an interference fit through another circular hole 4 cut into the insulating back sheet 14. The extruded metal frame 11 comprises a plurality of fingers (see FIG. 5) which operate to receive the glazing 12, the absorber 18, and the insulating back sheet 14, wherein the fingers are configured to direct the airflow between a bottom surface of the absorber 18 (not visible in this view) and a top surface 2 of the insulating back sheet 14 so as to prevent dust particle accumulation over the top surface of the absorber 18. In a preferred embodiment, the bottom surface of the absorber 18 includes surface protrusions which operate to induce turbulence in the airflow over the bottom surface of the absorber 18. For instance, the bottom surface of the absorber 18 may include rows of protrusions, embossed or engraved, on the bottom surface of the absorber 18 across the length or width of the absorber 18. The cross section of the protrusions may be circular, rectangular, etc.

Figure 4:
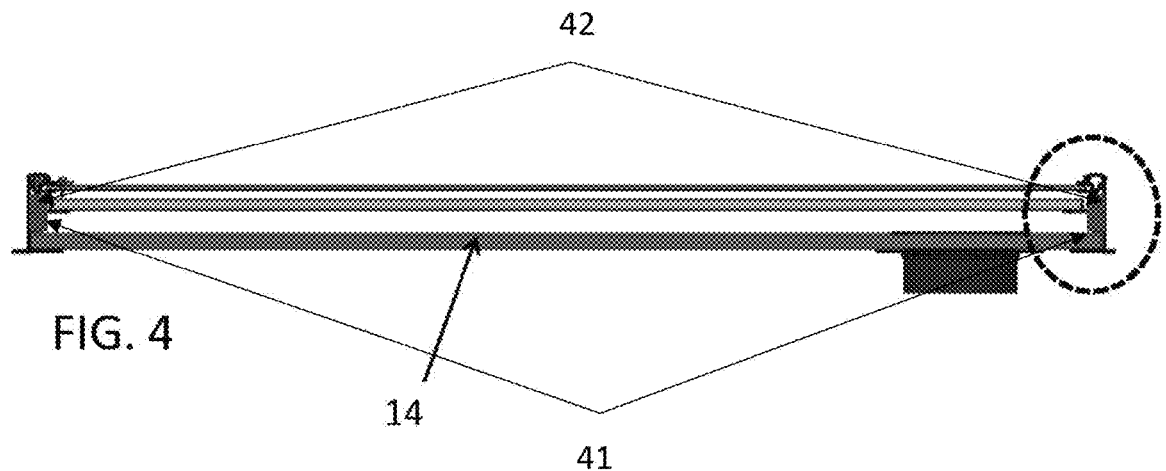
FIG. 4 shows a side view of a preferred embodiment of the modular solar air heater of FIG. 1 having an extruded cover with two additional insulating rings, secured to the extruded metal frame.
Figure 5:
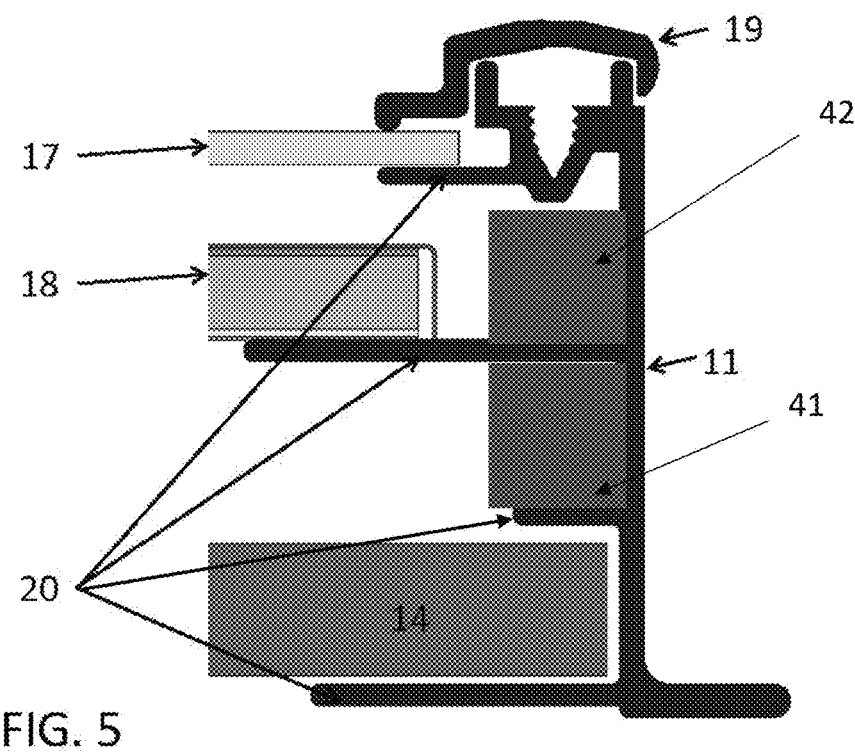
FIG. 5 shows a partial cutaway side view of the modular solar air heater of FIG. 4 showing how the glazing, the absorber, the insulating back sheet and the two additional insulating rings are secured to the extruded metal frame.

FIG. 4 depicts a side view of a preferred embodiment of the modular solar air heater 10 of FIG. 1 having an extruded cover and two additional insulating rings 41 and 42, secured to the extruded metal frame 11 (shown in more details in FIG. 5). The additional insulating rings may be made from the same material of the insulating back sheet 14. They are placed on the fingers (shown in FIG. 5) of the extruded metal frame 11 and provide additional thermal insulation to the heater 10.

FIG. 5 depicts a partial cutaway side view of the modular solar air heater 10 of FIG. 4 showing in details how the glazing 17, the absorber 18, the insulating back sheet 14 and the two additional insulating rings 41 and 42 are secured to the extruded metal frame 11 via four (4) fingers 20. In one instance, the fingers 20 are disposed equidistantly apart along a vertical direction of the frame 11. It is contemplated that other spacings between the fingers 20 may be utilized. In this preferred embodiment, an extruded cover 19 is included and coupled with the extruded metal frame 11 so as to further secure the glazing 17 to the extruded metal frame 11. In another preferred embodiment, the extruded cover 19 further includes a seal which operates to seal a top surface of the glazing 17. In another preferred embodiment, at least one of the fingers 20 includes a silicone sealant (not shown for clarity) which operates to secure at least one of the glazing 17 and the insulating back sheet 14 to the extruded metal frame 11. In yet another preferred embodiment, the absorber 18 and the insulating back sheet 14, forming a subassembly, are secured to the extruded metal frame 11 via interference fit of the absorber 18 and the insulating back sheet 14 and the fingers 20.

Figure 6:
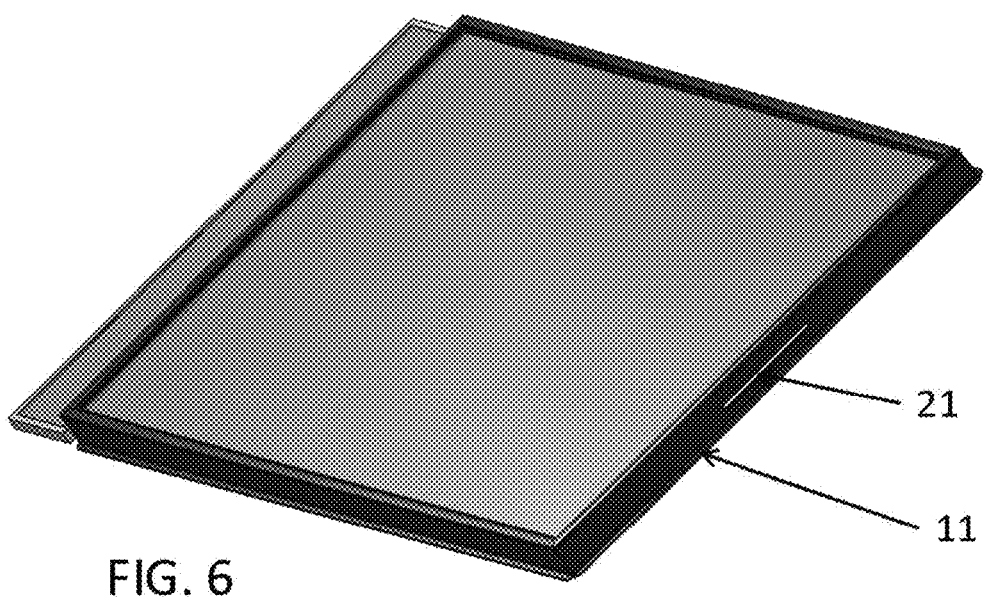
FIG. 6 shows a perspective top view of a preferred embodiment of the modular solar air heater of FIG. 1 having a bypass channel.

FIG. 6 depicts a perspective top view of a preferred embodiment of the modular solar air heater 10 of FIG. 1 having a bypass channel 21. The bypass channel 21 may be incorporated into any part of the heater 10, for instance on one side of the heater 10. The bypass channel 21, as described more fully below, allows the air 23 to exit the heater 10.

Figure 7:
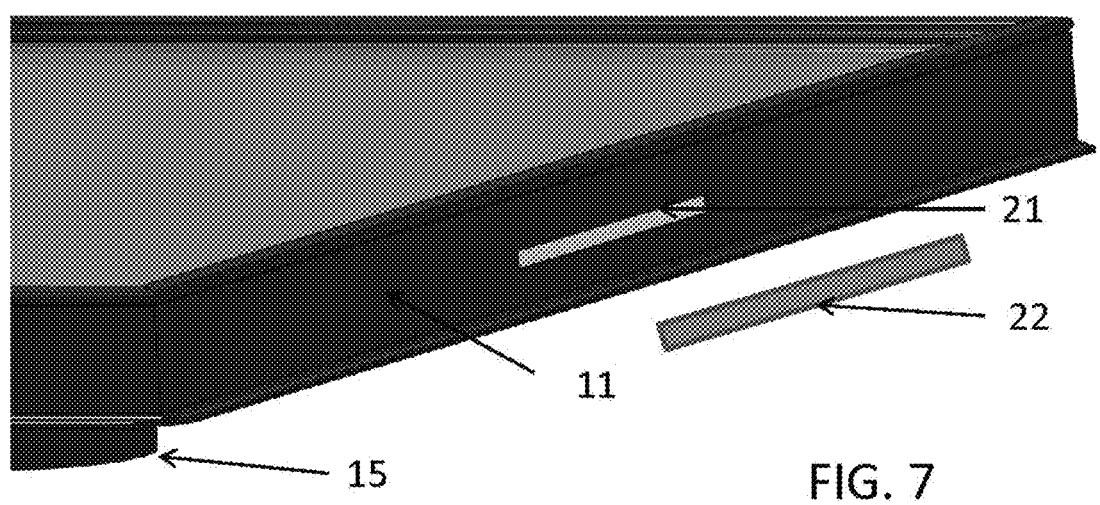
FIG. 7 shows a partial cutaway perspective top view of the modular solar air heater of FIG. 6 showing a removable bypass channel cover.

FIG. 7 depicts a partial cutaway perspective top view of the modular solar air heater 10 of FIG. 6 showing a removable bypass channel cover 22. The bypass cover 22 can be manually inserted into and removed from the bypass channel 21. In a preferred embodiment, the bypass channel 21 and the air outlet 15 are integrated, for instance, via a T-section ducting system with an integrated control system, wherein passage of the air 23 may be controlled alternatively through the air outlet 15, the bypass channel 21, or both. For instance, each of the two (2) paths for the air outlet 15 and the bypass channel 21 of the T-section ducting system includes a valve that are controllably actuated via a control system to partially or totally open and close the two (2) paths. The heater 10 can thus be used as a cooler by allowing the air 23 to exit through the bypass channel 21 instead of air outlet 15.

For instance, during warm weather conditions, the bypass channel cover 22 can be removed to allow the heater 10 to vent warm air to the external environment instead of through to a building or room interior. Accordingly, the heater 10 draws warmer air in from the building interior through air inlet 16 which is exited through the bypass channel 21. This causes a pressure drop allowing for cooler air from the building exterior to be pulled into the building space through other building airways. This is similar to the performance of an attic fan or whole house fan used to create negative pressure in a building space to draw in external air for cooling.

Figure 8A:
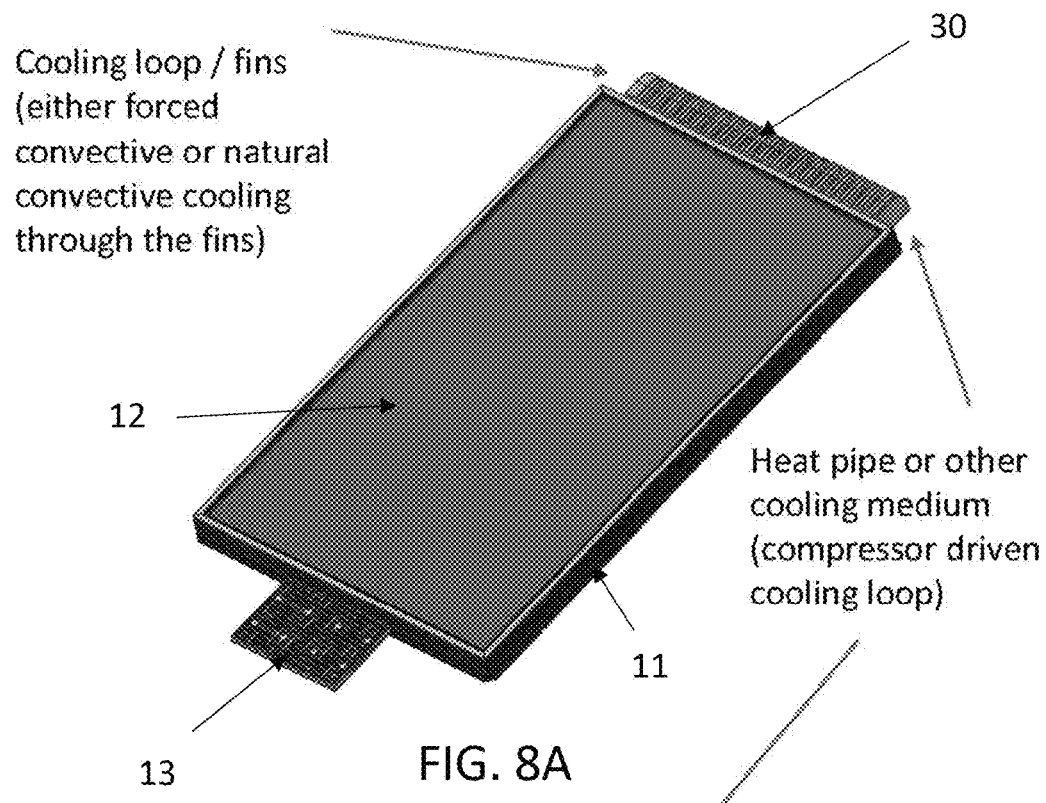
FIG. 8A shows a perspective top view of a preferred embodiment of the modular solar air heater of FIG. 1 having a cooling element which may include a cooling loop and heat exchanger fins.
Figure 8B:
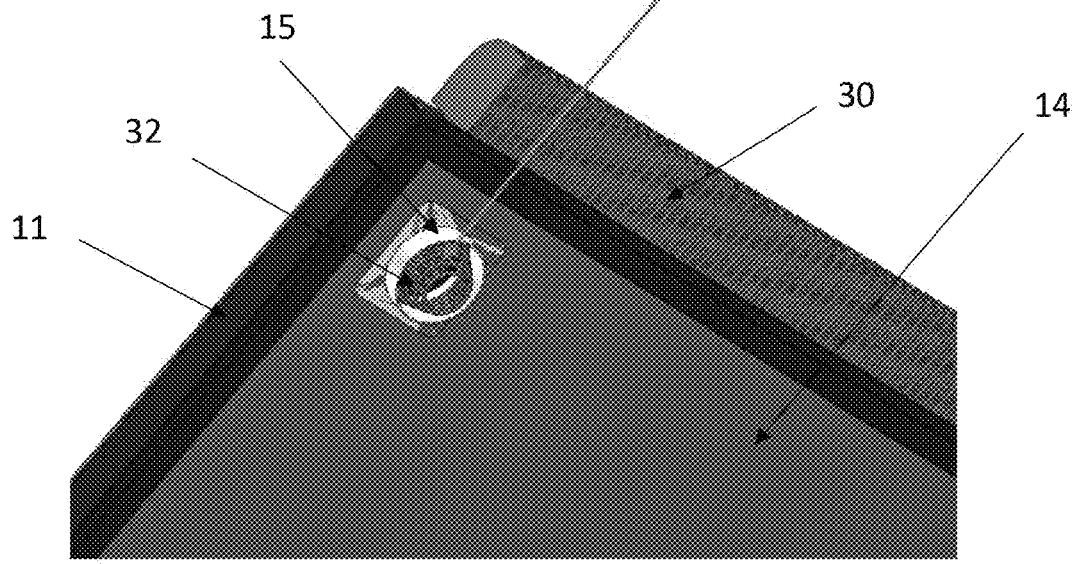
FIG. 8B shows a partial cutaway perspective bottom view of the modular solar air heater of FIG. 8A.

FIG. 8A depicts a perspective top view of a preferred embodiment of the modular solar air heater 10 of FIG. 1 having a cooling element which may include a cooling loop (shown in FIG. 8B) and heat exchanger fins 30. FIG. 8B depicts a partial cutaway perspective bottom view of the modular solar air heater 10 of FIG. 8A showing the cooling loop 32. The cooling medium, through the cooling loop 32 and the heat exchanger fins 30 may be driven via a compressor (not shown). The heat exchanger fins 30 may transfer heat through natural convective or forced convective heat transfer.

Figure 9A:
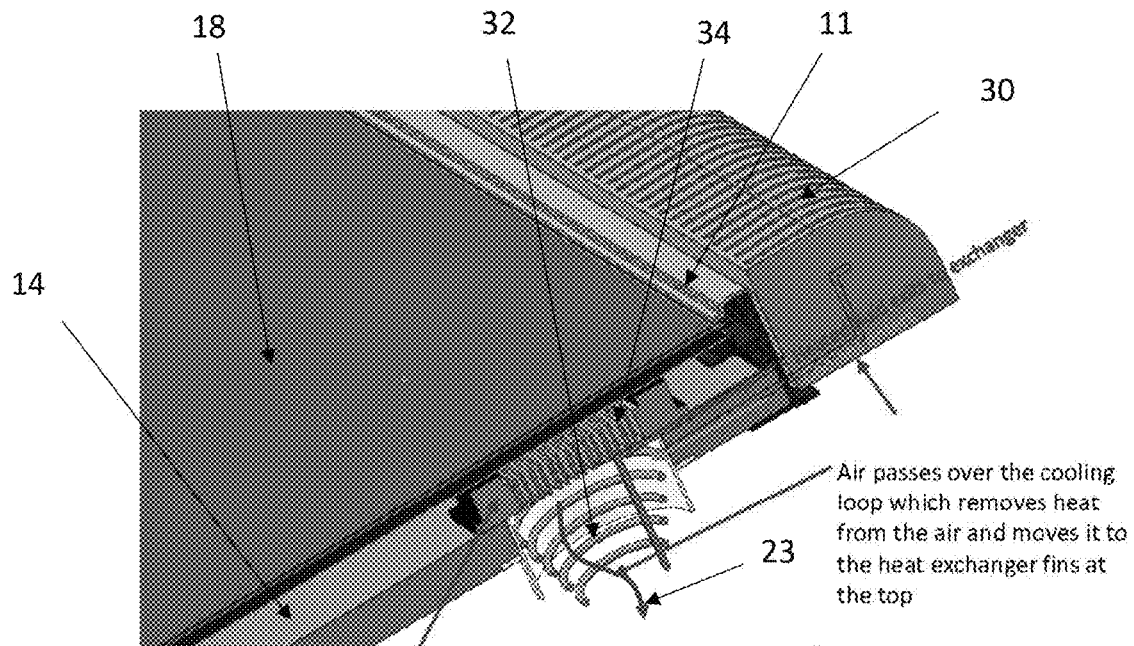
FIG. 9A shows a partial cutaway perspective top view of a preferred embodiment of the modular solar air heater of FIG. 1 having a heating element adjacent to the cooling element.
Figure 9B:
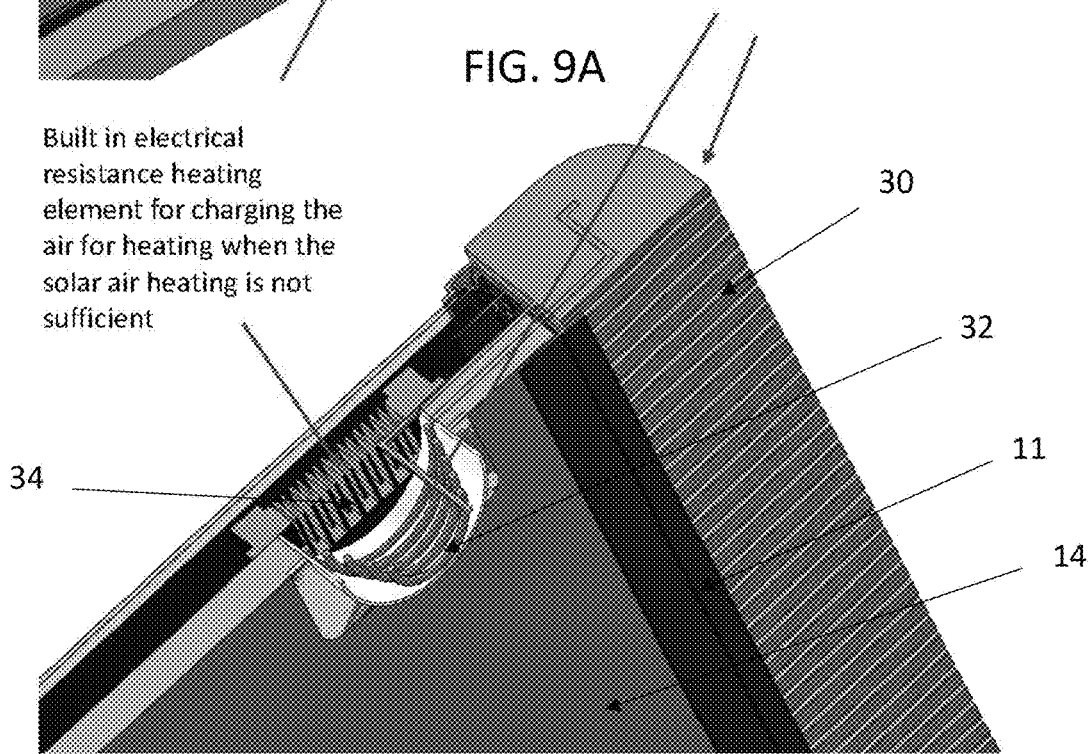
FIG. 9B shows a partial cutaway perspective bottom view of the modular solar air heater of FIG. 9A.

FIG. 9A depicts a partial cutaway perspective top view of a preferred embodiment of the modular solar air heater 10 of FIG. 1 having a heating element 34 adjacent to the cooling element which includes the heat exchanger fins 30 and the cooling loop 32. The air 23 passes over the cooling loop 32 which removes the heat from the air 23 and moves it to the heat exchanger fins 30. FIG. 9B depicts a partial cutaway perspective bottom view of the modular solar air heater 10 of FIG. 9A. In this preferred embodiment, the heating element 34 is an electrical resistance type heating element and it can be utilized to provide additional heat to that provided by the heater 10.

Figure 10:
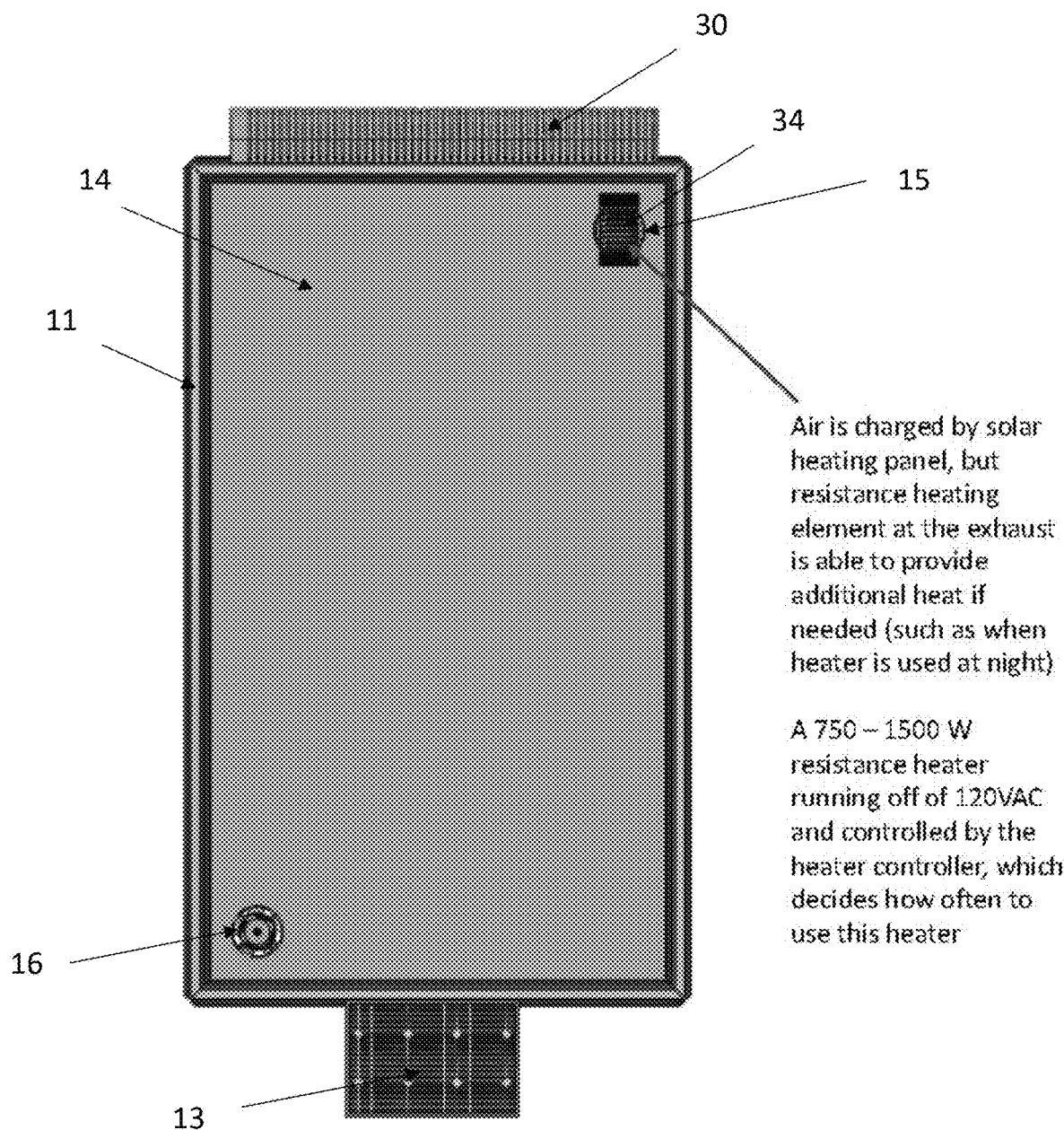
FIG. 10 shows a bottom view of a preferred embodiment of the modular solar air heater of FIG. 1 having a heating element coupled with the air outlet.

FIG. 10 depicts a bottom view of a preferred embodiment of the modular solar air heater 10 of FIG. 1 showing the heating element 34 coupled with the air outlet 15. The air 23 is heated further via the heating element 34 where the heat generated by the heater 10 is insufficient, such as during night time operation. In a preferred embodiment, the heating element 34 is a 750 W-1500 W resistance type heating element which is powered by a 120 VAC power source (wall outlet). The heater 10 further includes a control system to selectively turn on and off the heating element 34 as needed.

Figure 11:
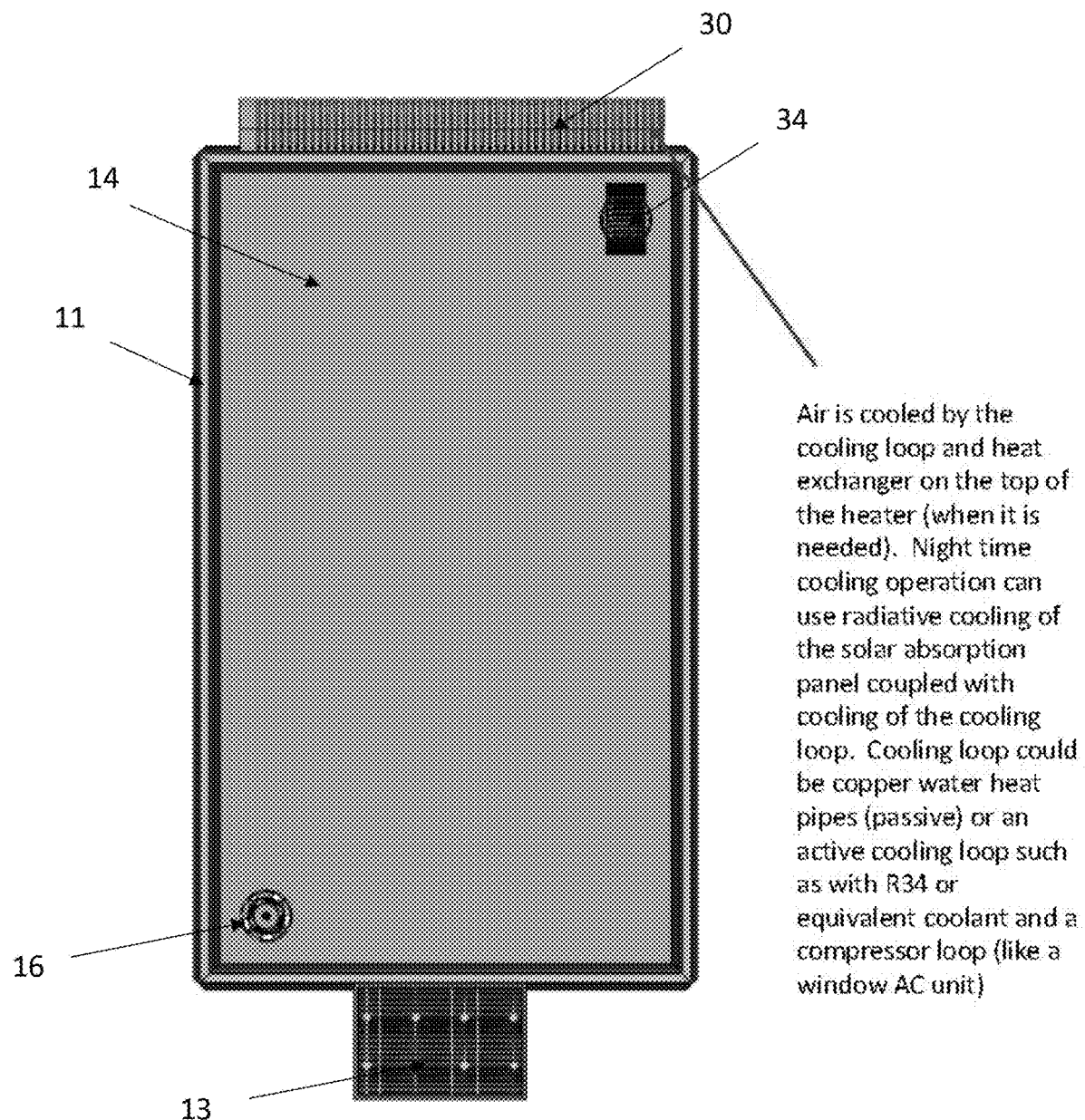
FIG. 11 shows the same view of the modular solar air heater of FIG. 10 specifying the dual use of the heater.

FIG. 11 depicts the same view of the modular solar air heater 10 of FIG. 10 specifying the dual use of the heater 10. When operated as a cooler during the night, the absorber 18 radiates the heat away from the air 23 in addition to the cooling of the air 23 that is accomplished through the cooling loop 32 and heat exchanger fins 30 (see FIGS. 9A and 9B).

Figure 12A:
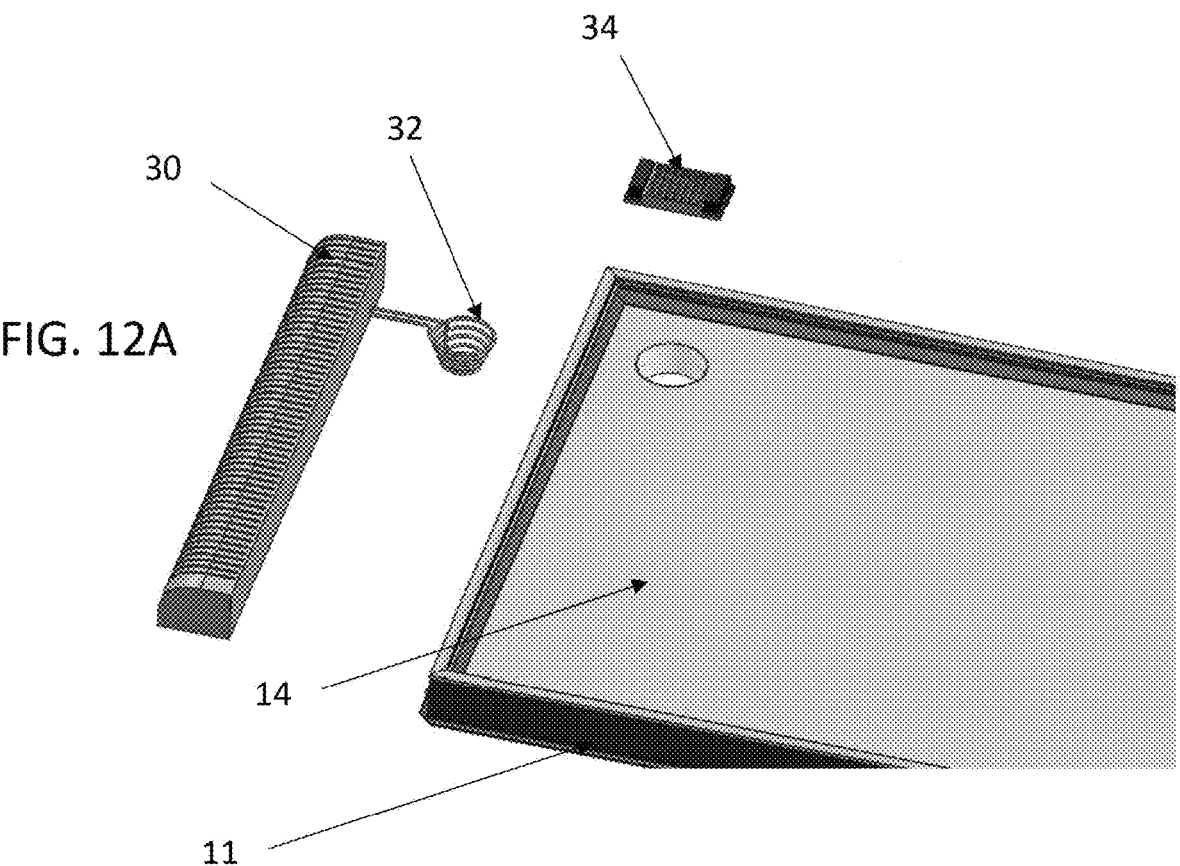
FIG. 12A shows a partial cutaway exploded view of a preferred embodiment of the modular solar air heater of FIG. 1 having a heating element and a cooling element.
Figure 12B:
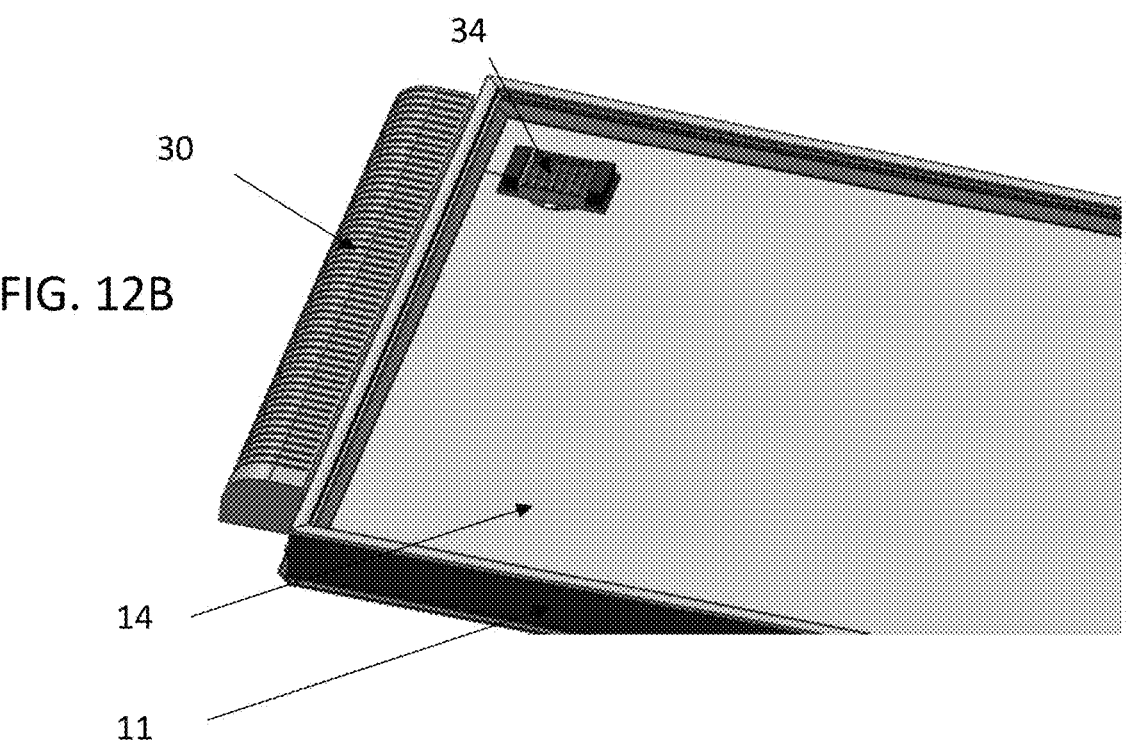
FIG. 12B shows a partial cutaway top view of the modular solar air heater of FIG. 12A.

FIG. 12A depicts a partial cutaway exploded view of a preferred embodiment of the modular solar air heater 10 of FIG. 1 having the heating element 34 and the cooling, element which includes the cooling loop 32 and the heat exchanger fins 30. In a preferred embodiment, the cooling loop 32 is a heat pipe. FIG. 12B depicts a partial cutaway top view of the modular solar air heater 10 of FIG. 12A when fully assembled.

The foregoing explanations, descriptions, illustrations, examples, and discussions have been set forth to assist the reader with understanding this invention and further to demonstrate the utility and novelty of it and are by no means restrictive of the scope of the invention. It is the following claims, including all equivalents, which are intended to define the scope of this invention.

What is claimed is:

1. A modular solar air heater, comprising:
    (a) a glazing;
    (b) an absorber having a top surface and a bottom surface;
    (c) an insulating back sheet having an air inlet and an air outlet, wherein air enters through the air inlet and exits through the air outlet;
    (d) an extruded metal frame including a plurality of fingers operable to receive the glazing, the absorber, and the insulating back sheet, said fingers are configured to direct the airflow between the bottom surface of the absorber and a top surface of the insulating back sheet so as to prevent dust particle accumulation over the top surface of the absorber;
    (e) an active air circulation system coupled with the air inlet; and
    (f) a bypass channel, wherein the heater is configured to operate so as to direct the air to exit through at least one of the bypass channel and the air outlet.

2. The heater of claim 1, wherein the glazing is made from at least one of glass and polymer.

3. The heater of claim 1, wherein the absorber comprises TiNOX material.

4. The heater of claim 1, further comprising a thermostat operative to control a flowrate of the airflow through the active air circulation system.

5. The heater of claim 1, further comprising an extruded cover coupled with the extruded metal frame which operates to further secure the glazing to the extruded metal frame.

6. The heater of claim 5, wherein the extruded cover further includes a seal which operates to seal a top surface of the glazing.

7. The heater of claim 1, wherein at least one of the fingers includes a silicone sealant which operates to secure at least one of the glazing and the insulating back sheet to the extruded metal frame.

8. The heater of claim 1, wherein the absorber and the insulating back sheet are secured to the extruded metal frame via interference fit of the absorber and the insulating back sheet and the fingers.

9. The heater of claim 1, further comprising two insulating rings, secured to the extruded metal frame.

10. The heater of claim 1, wherein the bypass channel and the air outlet are integrated.

11. The heater of claim 1, further comprising a heating element coupled with the air outlet which operates to further heat, the air through the air outlet.

12. The heater of claim 1, further comprising a cooling element coupled with the air outlet which operates to further cool the air through the air outlet.

13. The heater of claim 12, wherein the cooling element comprises a cooling loop and heat exchanger fins.

14. The heater of claim 13, wherein the cooling loop is a heat pipe.

15. The heater of claim 12, wherein the cooling element is further coupled with the absorber which operates to radiate heat through the absorber.

16. The heater of claim 1, further comprising a photovoltaic panel operative to provide electrical power to the heater.

17. A method of conditioning air via a modular solar air heater, comprising:
  (a) providing a glazing;
  (b) providing an absorber having a top surface and a bottom surface;
  (c) providing an insulating back sheet having an air inlet and an air outlet, wherein air enters through the air inlet and exits through the air outlet;
  (d) providing an extruded metal frame including a plurality of fingers operable to receive the glazing, the absorber, and the insulating back sheet, said fingers are configured to direct the airflow between the bottom surface of the absorber and a top surface of the insulating back sheet so as to prevent dust particle accumulation over the top surface of the absorber;
  (e) providing an active air circulation system coupled with the air inlet; and
  (f) providing a bypass channel, wherein the heater is configured to operate so as to direct the air to exit through at least one of the bypass channel and the air outlet.

* * * * *